US012763238B2

(12) United States Patent
Kakuda et al.

(10) Patent No.: US 12,763,238 B2
(45) Date of Patent: Oct. 13, 2026

(54) FERRITE COMPOSITION, FERRITE SINTERED BODY, AND ELECTRONIC DEVICE

(71) Applicant: TDK CORPORATION, Tokyo (JP)

(72) Inventors: Kouichi Kakuda, Tokyo (JP); Yuya Oshima, Tokyo (JP); Kenji Komorita, Tokyo (JP); Shigeshi Osawa, Yurihonjo-city (JP); Shinichi Kondo, Tokyo (JP); Hiroyuki Tanoue, Tokyo (JP); Kaori Sasaki, Tokyo (JP); Takuya Niibori, Tokyo (JP); Yukio Takahashi, Tokyo (JP); Hidenobu Umeda, Tokyo (JP)

(73) Assignee: TDK CORPORATION, Tokyo (JP)

( * ) Notice: Subject to any disclaimer, the term of this patent is extended or adjusted under 35 U.S.C. 154(b) by 603 days.

(21) Appl. No.: 18/330,073

(22) Filed: Jun. 6, 2023

(65) Prior Publication Data

US 2023/0402211 A1 Dec. 14, 2023

(30) Foreign Application Priority Data

Jun. 9, 2022 (JP) ................................ 2022-093689

(51) Int. Cl.
*H01F 1/34* (2006.01)
*C04B 35/26* (2006.01)

(52) U.S. Cl.
CPC ........... *H01F 1/344* (2013.01); *C04B 35/265* (2013.01); *C04B 2235/3274* (2013.01); *C04B 2235/3277* (2013.01); *C04B 2235/3293* (2013.01); *C04B 2235/3298* (2013.01)

(58) Field of Classification Search
CPC ........................ H01F 1/34-375; C04B 35/265
See application file for complete search history.

(56) References Cited

U.S. PATENT DOCUMENTS

| | | | | |
|---|---|---|---|---|
| 2007/0138431 | A1 * | 6/2007 | Wada | C04B 35/62685 252/62.62 |
| 2008/0296528 | A1 | 12/2008 | Sutoh et al. | |
| 2011/0226982 | A1 | 9/2011 | Wada et al. | |
| 2018/0057408 | A1 * | 3/2018 | Kakuda | C04B 35/265 |

FOREIGN PATENT DOCUMENTS

| | | | |
|---|---|---|---|
| CN | 1988067 | A | 6/2007 |
| JP | 2003-272912 | A | 9/2003 |
| JP | 2008-300548 | A | 12/2008 |
| JP | 2011-213578 | A | 10/2011 |

* cited by examiner

*Primary Examiner* — Matthew E. Hoban
(74) *Attorney, Agent, or Firm* — Oliff PLC

(57) ABSTRACT

A ferrite composition includes a main component and a sub component. The main component includes an iron oxide in terms of $Fe_2O_3$, a copper oxide in terms of CuO, a zinc oxide in terms of ZnO, and a nickel oxide as its remainder. The sub component includes a cobalt oxide in terms of $Co_3O_4$, a tin oxide in terms of $SnO_2$, and a bismuth oxide in terms of $Bi_2O_3$. A is −3.5 or more and 1.0 or less, provided that $A=(\alpha-18)/\beta$; is defined, in which $\alpha$ is an amount of the zinc oxide represented by mol % in terms of ZnO in the main component, and $\beta$ is an amount of the cobalt oxide represented by parts by weight in terms of $Co_3O_4$ with respect to 100 parts by weight of the main component.

8 Claims, 2 Drawing Sheets

FERRITE COMPOSITION, FERRITE SINTERED BODY, AND ELECTRONIC DEVICE

BACKGROUND OF THE INVENTION

Figure 1:
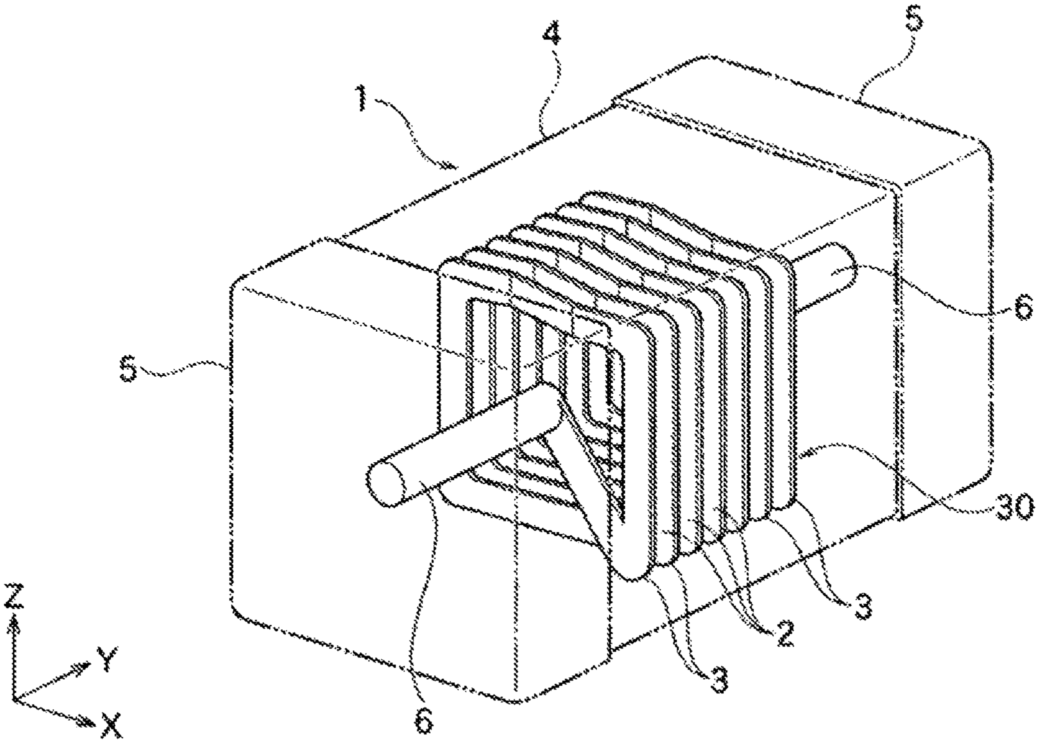

The present invention relates to a ferrite composition, a ferrite sintered body, and an electronic device.

For example, Patent Document 1 shown below discloses a ferrite composition containing $Fe_2O_3$, NiO, CuO, ZnO, and CoO in a predetermined proportion, and it is expected that noise can be removed favorably in a high frequency band.

Patent Document 1: JP2008300548 (A)

BRIEF SUMMARY OF THE INVENTION

The present invention has been achieved under such circumstances. It is an object of the invention to provide a ferrite sintered body capable of being favorably used in a high frequency band and having an excellent mechanical strength, a composition of the ferrite sintered body, and an electronic device including the composition.

As a result of intensive studies on ferrite compositions used for favorable electronic devices in a high frequency band, the present inventors have found the following problems: electronic devices manufactured with a ferrite composition containing a large amount of Co oxides tend to have an insufficient strength of an element body (sintered body) and defects, such as cracks, and become less reliable.

In case of obtaining electronic devices to which ferrite compositions are applied, if a sintered body composed of the ferrite composition has an insufficient strength, the electronic devices tend to lack durability against mechanical stresses, such as bending and tensile, and may have defects, such as chipping and cracking. Therefore, it is desired to develop a ferrite composition capable of exhibiting a higher strength.

As a result of intensive studies for overcoming the above-mentioned problems, the present inventors have found that a ferrite sintered body including a ferrite composition in which the amounts of Co oxide and Sn oxide are within predetermined numerical ranges has a high bending strength and a large real part μ' of the complex permeability at high frequencies (e.g., around 900 MHz, i.e., 700 MHz to 1.7 GHz) and have achieved the present invention.

That is, a ferrite composition according to the present invention comprises a main component and a sub component, wherein the main component includes:

40.5 to 50.0 mol % of an iron oxide in terms of $Fe_2O_3$;

6.0 to 14.0 mol % of a copper oxide in terms of CuO;

7.0 to 25.0 mol % of a zinc oxide in terms of ZnO; and a nickel oxide as a remainder of the main component, with respect to 100 parts by weight of the main component, the sub component includes:

3.1 to 10.0 parts by weight of a cobalt oxide in terms of $Co_3O_4$;

0.5 to 4.0 parts by weight of a tin oxide in terms of $SnO_2$; and 0.50 parts by weight or less (including zero) of a bismuth oxide in terms of $Bi_2O_3$, and A is −3.5 or more and 1.0 or less, provided that $A=(\alpha-18)/\beta$ is defined, in which α is an amount of the zinc oxide represented by mol % in terms of ZnO in the main component, and β is an amount of the cobalt oxide represented by parts by weight in terms of $Co_3O_4$ with respect to 100 parts by weight of the main component.

Preferably, β/γ is 1.6 or more, in which γ is an amount of the tin oxide in terms of $SnO_2$ with respect to 100 parts by weight of the main component.

Preferably, a ferrite sintered body comprises the ferrite composition.

Preferably, an electronic device comprises the ferrite composition.

BRIEF DESCRIPTION OF THE DRAWING(S)

Figure 2:
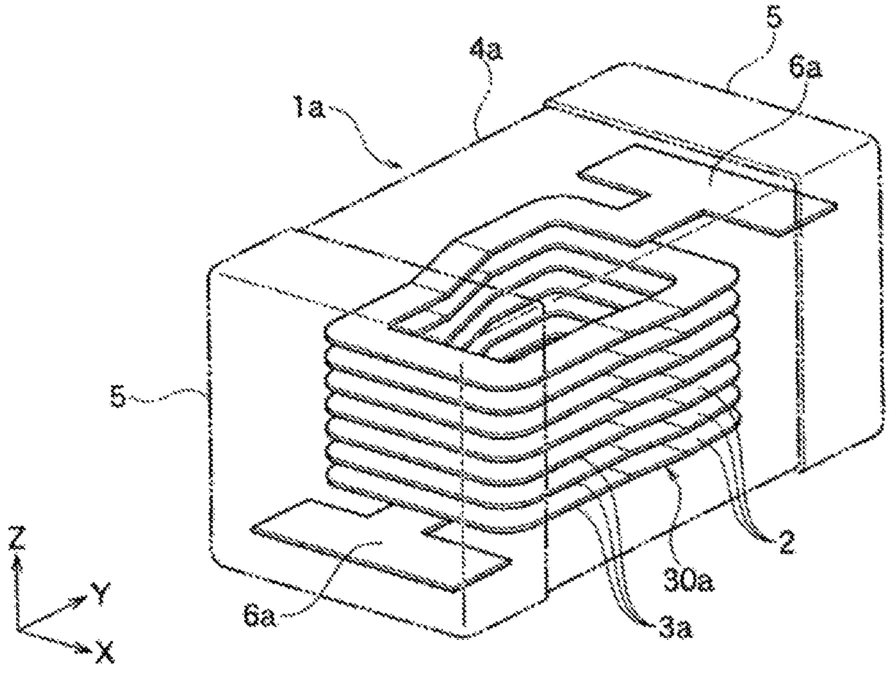

FIG. 1 is an internal see-through perspective view of a chip coil as an electronic device according to an embodiment of the present invention; and FIG. 2 is an internal see-through perspective view of a chip coil as an electronic device according to another embodiment of the present invention.

DETAILED DESCRIPTION OF THE INVENTION

Hereinafter, embodiments of the present invention are described.

As shown in FIG. 1, a chip coil 1 as an electronic device according to an embodiment of the present invention includes a chip body 4 in which ceramic layers 2 and internal electrode layers 3 are alternately laminated in the Y-axis direction.

The internal electrode layers 3 each have a square ring or C shape and are spirally connected by a through-hole electrode (not shown) or stepped electrode for internal electrode connection penetrating through the adjacent ceramic layers 2 to constitute a coil conductor 30.

Terminal electrodes 5 and 5 are formed at both ends of the chip body 4 in the Y-axis direction. Each of the terminal electrodes 5 and 5 is connected to an end of a terminal connection through-hole electrode 6 penetrating through the laminated ceramic layers 2, and the terminal electrodes 5 and 5 are connected to both ends of the coil conductor 30 constituting a closed magnetic circuit coil (winding pattern).

In the present embodiment, the lamination directions of the ceramic layers 2 and the internal electrode layers 3 correspond with the Y-axis, and the end surfaces of the terminal electrodes 5 and 5 are parallel to the X-axis and the Z-axis. The X, Y, and Z-axes are perpendicular to each other. In the chip coil 1 shown in FIG. 1, the winding axis of the coil conductor 30 substantially corresponds with the Y-axis.

The outer shape and dimensions of the chip body 4 are not limited and can be appropriately determined according to the application. Normally, the outer shape of the chip body 4 is substantially rectangular parallelepiped. For example, the chip body 4 has an X-axis dimension of 0.15 to 0.8 mm, a Y-axis dimension of 0.3 to 1.6 mm, and a Z-axis dimension of 0.1 to 1.0 mm.

The inter-electrode thickness and the base thickness of the ceramic layers 2 are not limited. The inter-electrode thickness (interval between the internal electrode layers 3 and 3) can be determined to be about 3 to 50 Lim, and the base thickness (length of the terminal connection through-hole electrode 6 in the Y-axis direction) can be determined to be about 5 to 300 μm.

In the present embodiment, the terminal electrodes 5 are not limited and are formed by applying a conductive paste mainly composed of Ag, Pd, etc. to the outer surface of the body 4, baking the paste, and electroplating the paste. Cu, Ni, Sn, etc. can be used for electroplating.

The coil conductor 30 contains Ag (including an alloy of Ag) and is composed of, for example, a simple substance of Ag, a Ag—Pd alloy, or the like. The coil conductor can contain a sub component of Zr, Fe, Mn, Ti, and their oxides.

The ceramic layers 2 are composed of a ferrite composition according to an embodiment of the present invention. Hereinafter, the ferrite composition is described in detail.

The ferrite composition according to the present embodiment contains a main component of iron oxide, copper oxide, zinc oxide, and nickel oxide.

In 100 mol % of the main component, in terms of $Fe_2O_3$, the amount of iron oxide is 40.5 mol % or more, preferably 42.0 mol % or more, more preferably 43.0 mol % or more, and 50.0 mol % or less, preferably 48.0 mol % or less, more preferably 47.0 mol % or less. If the amount of iron oxide is too small, the real part μ' of the complex permeability at high frequencies around 900 MHz tends to decrease, and the specific resistance tends to decrease. If the amount of iron oxide is too large, the mechanical strength tends to decrease, and the temperature characteristics of the initial permeability μi tend to deteriorate.

In 100 mol % of the main component, in terms of CuO, the amount of copper oxide is 6.0 mol % or more, preferably 8.0 mol % or more, and 14.0 mol % or less, more preferably 12.5 mol % or less. If the amount of copper oxide is too small, the bending strength tends to decrease, and the specific resistance tends to decrease. If the amount of copper oxide is too large, the real part μ' of the complex permeability tends to decrease, and the specific resistance tends to decrease.

In 100 mol % of the main component, in terms of ZnO, the amount (α) of zinc oxide is 7.0 mol % or more, preferably 9.0 mol % or more, more preferably 11.0 mol % or more, and 25.0 mol % or less, preferably 23.0 mol % or less. If the amount of zinc oxide is too small, the specific resistance tends to decrease. If the amount of zinc oxide is too large, the Curie temperature tends to decrease excessively. Moreover, the real part μ' of the complex permeability at high frequencies around 900 MHz tends to decrease, and the specific resistance tends to decrease.

The remainder of the main component is composed of nickel oxide. The amount of nickel oxide in the main component is not limited, but is, for example, 15.0 to 40.0 mol % in terms of NiO. If the amount of nickel oxide is too small, the Curie temperature tends to decrease excessively. If the amount of nickel oxide is too large compared to that of iron oxide, the real part μ' of the complex permeability at high frequencies around 900 MHz tends to decrease.

In addition to the above-mentioned main component, the ferrite composition according to the present embodiment contains a sub component of at least cobalt oxide and tin oxide.

With respect to 100 parts by weight of the main component, in terms of $CO_3O_4$, the amount (β) of cobalt oxide is 3.1 parts by weight or more, preferably 3.5 parts by weight or more, and 10.0 parts by weight or less, preferably 8.0 parts by weight or less. If the amount of cobalt oxide is too small, the real part μ' of the complex permeability at high frequencies around 900 MHz tends to decrease. If the amount of cobalt oxide is too large, the real part μ' of the complex permeability tends to decrease, and the specific resistance tends to deteriorate.

With respect to 100 parts by weight of the main component, in terms of $SnO_2$, the amount (γ) of tin oxide is 0.5 parts by weight or more, preferably 0.8 parts by weight or more, and 4.0 parts by weight or less, preferably 3.0 parts by weight or less. If the amount of tin oxide is too small, the improvement effect on the bending strength and the improvement effect on the temperature change rate of the initial permeability pi tend to be obtained insufficiently. If the amount of tin oxide is too large, the real part μ' of the complex permeability at high frequencies around 900 MHz tends to decrease, the specific resistance tends to decrease, and the bending strength tends to decrease.

In the present embodiment, preferably, the following relational formula is satisfied between the amount of zinc oxide and the amount of cobalt oxide. That is, A is −3.5 or more and 1.0 or less, preferably −3.5 or more and 0.9 or less, provided that $A=(\alpha-18)/\beta$ is satisfied, in which α is an amount of zinc oxide represented by mol % in terms of ZnO in the main component, and β is an amount of cobalt oxide represented by parts by weight in terms of $Co_3O_4$ with respect to 100 parts by weight of the main component. If A is too low or too high, the real part μ' of the complex permeability at high frequencies around 900 MHz tends to decrease.

In the present embodiment, β/γ is preferably 1.6 or more, more preferably 1.6 or more and 10.0 or less, in which γ is an amount of tin oxide in terms of $SnO_2$ with respect to 100 parts by weight of the main component. In such a range, the real part μ' of the complex permeability at high frequencies around 900 MHz can be higher, and the bending strength is improved.

In addition to the above-mentioned sub component, the ferrite composition according to the present embodiment may further contain bismuth oxide. With respect to 100 parts by weight of the main component, in terms of $Bi_2O_3$, the amount of bismuth oxide is preferably 0.5 parts by weight or less (including zero), more preferably less than 0.3 parts by weight (including zero), particularly preferably less than 0.2 parts by weight (including zero). If the amount of bismuth oxide is too large, the bending strength tends to decrease. This is probably because the grain growth progresses too much.

Moreover, in addition to the above-mentioned components, the ferrite composition according to the present embodiment may further contain silicon oxide. The amount of silicon oxide is not limited. With respect to 100 parts by weight of the main component, in terms of $SiO_2$, the amount of silicon oxide may be 0.3 parts by weight or less (including zero), less than 0.2 parts by weight (including zero), less than 0.15 parts by weight (including zero), or less than 0.1 parts by weight (including zero).

Moreover, in addition to the above-mentioned components, the ferrite composition according to the present embodiment may contain an additional component, such as manganese oxides (e.g., $Mn_3O_4$), zirconium oxides, magnesium oxides, and glass compounds, within a range where the effects of the present embodiment are not disturbed. The amount of the additional component is not limited and is, for example, 1 part by weight or less (including zero).

Moreover, the ferrite composition according to the present embodiment may contain oxides of unavoidable impurity elements.

Specifically, the unavoidable impurity elements include C, S, Cl, As, Se, Br, Te, and I, typical metal elements of Li, Na, Mg, Al, Ca, Ga, Ge, Sr, Cd, In, Sb, Ba, Pb, etc., and transition metal elements of Sc. Ti, V. Cr, Y, Nb, Mo, Pd. Ag, Hf, Ta, etc. Preferably, the oxides of the unavoidable impurity elements are contained in the ferrite composition in an amount of about 0.05 parts by weight or less.

The average crystal particle size of the crystal particles in the ferrite composition according to the present embodiment is not limited and is, for example, 0.2 to 2.0 μm. The amount of each constituent of the main component and the sub component hardly changes in each step from the stage of raw material powders to the stage after firing during the production of the ferrite composition.

In the ferrite composition according to the present embodiment, the composition of the main component is controlled within the above-mentioned range, tin oxide and cobalt oxide are contained within the above-mentioned ranges as the sub component, and A is controlled within a predetermined range. Thus, in the ferrite composition according to the present embodiment, the real part μ' of the complex permeability, particularly at high frequencies around 900 MHz, is large, and it is possible to obtain a ferrite sintered body having a high mechanical strength, such as bending strength, and being excellent in reliability. Moreover, in the ferrite composition according to the present embodiment, it is possible to obtain a ferrite sintered body having a high specific resistance and favorable temperature characteristics of the initial permeability μi.

When the real part μ' of the complex permeability of the ferrite sintered body is large, the impedance of the chip coil (chip bead) using the ferrite sintered body is large. Moreover, when the real part μ' of the complex permeability is large, particularly at high frequencies around 900 MHz, the impedance is large, particularly at high frequencies.

In general, since the real part μ' of the complex permeability decreases at high frequencies based on Snoek's limit, it is difficult to obtain a high impedance at high frequencies. In the present embodiment, since the real part μ' of the complex permeability at high frequencies can be improved, the ferrite composition is preferably used for chip coils (chip beads) used at high frequencies, the noise reduction effect, particularly at high frequencies, is large. The ferrite sintered body composed of the ferrite composition according to the present embodiment is used not only for chip coils, but also for composite electronic devices in which a coil, such as an inductor and an LC composite component, and another element, such as a capacitor, are combined.

Next, an example of a method of manufacturing a ferrite composition according to the present embodiment is described. First, starting raw materials (a raw material for a main component and a raw material for a sub component) are weighed so as to have a predetermined composition proportion and mixed, and a raw material mixture is obtained. Examples of mixing methods include a wet mixing using a ball mill and a dry mixing using a dry mixer. Preferably, the starting raw materials have an average particle size of 0.05 to 3.0 μm.

As the raw material for the main component, it is possible to use iron oxides ($\alpha$-$Fe_2O_3$), copper oxides (CuO), nickel oxides (NiO), zinc oxides (ZnO), composite oxides, or the like. In addition, it is possible to use various compounds to be the above-mentioned oxides or composite oxides by firing. Examples of the substances to be the above-mentioned oxides by firing include simple metals, carbonates, oxalates, nitrates, hydroxides, halides, and organometallic compounds.

As the raw material for the sub component, it is possible to use tin oxides and cobalt oxides, and if necessary, bismuth oxides, other oxides, or the like. The oxides to be the raw material for the sub component are not limited and can be composite oxides or the like. In addition, it is possible to use various compounds to be the above-mentioned oxides or composite oxides by firing. Examples of the substances to be the above-mentioned oxides by firing include simple metals, carbonates, oxalates, nitrates, hydroxides, halides, and organometallic compounds.

Next, the raw material mixture is calcined to obtain a calcined material. The calcination is carried out so as to cause a thermal decomposition of the raw materials, a homogenization of the components, a generation of ferrite, a disappearance of ultrafine powder by sintering, and a grain growth to an appropriate particle size and convert the raw material mixture into a suitable form for post-processing. The calcination time and the calcination temperature are not limited. The calcination is normally carried out in the atmosphere (air), but may be carried out in an atmosphere having an oxygen partial pressure lower than that of the atmosphere.

Next, the calcined material is pulverized to obtain a pulverized material. The pulverization is carried out so as to break the aggregation of the calcined material and obtain a powder having an appropriate sinterability. When the calcined material has a large lump, the calcined material is coarsely pulverized and thereafter subjected to a wet pulverization using a ball mill, an attritor, or the like. The wet pulverization is carried out until the average particle size of the pulverized material becomes preferably about 0.1 to 1.0 μm.

In the above-mentioned method of manufacturing the pulverized material, the powder of the main component and the powder of the subcomponent are all mixed and thereafter calcined. However, the method of manufacturing the pulverized material is not limited to the above-mentioned method. For example, some of the raw material powders mixed before the calcination can be mixed during the pulverization of the calcined material after the calcination, instead of being mixed with the other raw material powders before the calcination.

Next, the chip coil 1 shown in FIG. 1 according to the present embodiment is manufactured using the obtained pulverized material.

First, the obtained pulverized material is turned into a slurry with additives such as a solvent and a binder to prepare a ferrite paste. Then, the chip body 4 can be formed by alternately printing and laminating the obtained ferrite paste and an internal electrode paste containing Ag etc. and thereafter firing this laminated body (printing method). Instead, the chip body 4 may be formed by preparing green sheets using the ferrite paste, printing the internal electrode paste on the surfaces of the green sheets, and firing a laminated body obtained by laminating them (sheet method). In any case, the terminal electrodes 5 are formed by baking or plating after forming the chip body.

The amount of the binder and the amount of the solvent in the ferrite paste are not limited. For example, the amount of the binder can be determined in the range of 1 to 10 wt %, and the amount of the solvent can be determined in the range of about 10 to 50 wt %. If necessary, the paste may contain a dispersant, a plasticizer, etc. in an amount of 10 wt % or less. The internal electrode paste containing Ag etc. can also be produced in the same manner. The firing conditions are not limited, but when the internal electrode layers contain Ag etc., the firing temperature is preferably 930° C. or less and is more preferably 900° C. or less.

The ferrite composition according to the present embodiment is also excellent in sinterability and can be sintered at a low temperature. For example, the ferrite composition according to the present embodiment can be sintered at about 900° C. (950° C. or less), which is lower than the melting point of Ag, which can be used as the internal electrodes, and the chip coil 1 as shown in FIG. 1 can easily be manufactured.

The present invention is not limited to the above-mentioned embodiment and may variously be modified within the scope of the present invention.

For example, ceramic layers 2 of a chip coil 1*a* shown in FIG. 2 may be formed using the ferrite composition of the above-mentioned embodiment. The chip coil 1*a* shown in FIG. 2 includes a chip body 4*a* in which the ceramic layers 2 and internal electrode layers 3*a* are alternately laminated in the Z-axis direction.

The internal electrode layers 3*a* each have a square ring or C shape and are spirally connected by a through-hole electrode (not shown) or stepped electrode for internal electrode connection penetrating through the adjacent ceramic layers 2 to constitute a coil conductor 30*a*.

Terminal electrodes 5 and 5 are formed at both ends of the chip body 4*a* in the Y-axis direction. Each of the terminal electrodes 5 and 5 is connected to an end of a leading electrode 6*a* located above and below in the Z-axis direction, and the terminal electrodes 5 and 5 are connected to both ends of the coil conductor 30*a* constituting a closed magnetic circuit coil.

In the present embodiment, the lamination directions of the ceramic layers 2 and the internal electrode layers 3 correspond with the Z-axis, and the end surfaces of the terminal electrodes 5 and 5 are parallel to the X-axis and the Z-axis. The X, Y, and Z-axes are perpendicular to each other. In the chip coil 1*a* shown in FIG. 2, the winding axis of the coil conductor 30*a* substantially corresponds with the Z-axis.

In the chip coil 1 shown in FIG. 1, since the winding axis of the coil conductor 30 is in the Y-axis direction, which is the longitudinal direction of the chip body 4, the number of turns can be increased, and it is easy to increase the impedance up to a high frequency band, compared to the chip coil 1*a* shown in FIG. 2. Other configurations and effects of the chip coil 1*a* shown in FIG. 2 are the same as those of the chip coil 1 shown in FIG. 1.

Moreover, the ferrite composition of the present embodiment can be used for electronic devices other than the chip coil shown in FIG. 1 or FIG. 2. For example, the ferrite composition of the present embodiment can be used for a ceramic layer laminated with a coil conductor. Moreover, the chip coil does not necessarily have to be a multilayer chip coil, and the ferrite composition of the present embodiment can also be used for a wire-wound chip coil. In addition, for example, the ferrite composition of the present embodiment can also be used for a composite electronic device in which a coil, such as an LC composite component, and another element, such as a capacitor, are combined. In addition, the ferrite composition of the present embodiment can also be used for other electronic devices normally using ferrite, such as capacitors.

EXAMPLES

Hereinafter, the present invention is described based on more detailed examples, but the present invention is not limited to these examples.

Example 1

First, as raw materials for a main component of a ferrite composition, $Fe_2O_3$, NiO, CuO, and ZnO were prepared. As raw materials for a sub component, $SnO_2$ and $Co_3O_4$ were prepared. The starting raw materials had an average particle size of 0.1 to 3.0 μm.

Next, the prepared powders of the raw materials for the main component and the sub component were weighed so as to have the compositions shown in Tables 1A to 2 as sintered bodies.

The prepared powders of the raw materials for the main component and the sub component were weighed so that $A=(\alpha-18)/\beta$ would be the values in Tables, in which α is an amount of zinc oxide represented by mol % in terms of ZnO in the main component, β is an amount of cobalt oxide represented by parts by weight in terms of $Co_3O_4$ with respect to 100 parts by weight of the main component. Moreover, the prepared powders of the raw materials for the sub component were weighed so that β/γ would be the values in Tables, in which γ is an amount of tin oxide in terms of $SnO_2$ with respect to 100 parts by weight of the main component.

After weighing, the prepared raw materials for the main component were mixed in a wet manner by a ball mill for 24 hours to obtain a raw material mixture. Next, the obtained raw material mixture was dried and thereafter calcined in the air to obtain a calcined product. The calcination temperature was appropriately selected within the range of 500 to 900° C. according to the composition of the raw material mixture. After that, the calcined product was pulverized by a ball mill while being added with the raw materials of the sub component to obtain a pulverized powder.

Next, after drying the pulverized powder, 10.0 parts by weight of a polyvinyl alcohol aqueous solution having a concentration of 6 wt % as a binder was added to 100 parts by weight of the pulverized powder and granulated to obtain granules. These granules were molded under pressure to obtain toroidal-shaped green compacts, disk-shaped green compacts, and quadrangular prism-shaped green compacts corresponding to Sample Nos. 1 to 80.

As the toroidal-shaped green compacts, two types of green compacts of Toroidal A: green compacts with dimensions=8 mm (outer diameter)×4 mm (inner diameter)×2.5 mm (height) and Toroidal B: green compacts with dimensions=13 mm (outer diameter)×6 mm (inner diameter)×3 mm (height) were prepared corresponding to Sample Nos. 1 to 80. As the disk-shaped green compacts, green compacts with dimensions=12 mm (diameter)×2 mm (height) were prepared corresponding to Sample Nos. 1 to 80. As the quadrangular prism-shaped green compacts, green compacts with dimensions=5 mm (width)×25 mm (length)×3 mm (thickness) were prepared corresponding to Sample Nos. 1 to 80.

Next, the green compacts were fired in the air at 860 to 900° C., which is the melting point (962° C.) or less of Ag, for 2 hours to obtain toroidal A samples, toroidal B samples, disk samples, and quadrangular prism samples as sintered bodies. Moreover, the following characteristic evaluations were carried out for the obtained samples. It was confirmed by a fluorescent X-ray spectrometer that the composition hardly changed between the weighed raw material powder and the green compact after firing.

(Real Part μ' of Complex Permeability)

For the toroidal A samples, a permeability μ' was measured using an RF impedance analyzer (E4991A manufactured by Keysight Technologies) and a test fixture (16454A manufactured by Keysight Technologies). As the measurement conditions, the measurement frequencies were 10 MHz and 900 MHz, and the measurement temperature was 25° C. In the present examples, a case where μ' at 10 MHz was 4.7 or more and μ' at 900 MHz was 5.2 or more was considered to be good. More preferably, μ' at 900 MHz was 5.5 or more.

(Temperature Change Rate)

The toroidal B samples were wound with a copper wire by 20 turns, and an initial permeability μi at room temperature (25° C.) and an initial permeability pi at 85° C. were measured using an LF impedance analyzer (E4192A manufactured by Keysight Technologies). Then, a change rate of the initial permeability μi at 85° C. was obtained based on the initial permeability μi at room temperature.

(Specific Resistance ρ)

Both surfaces of the disk samples were coated with In—Ga electrodes, and a DC resistance value was measured to obtain a specific resistance ρ (unit: Ω·m). This measurement was performed using an IR meter (R8340 manufactured by ADC). A specific resistance ρ of $1.0\times10^{6}$ Ω·m or more (1.0E+06 Ω·m or more) was considered to be good.

(Bending Strength)

A three-point bending test was performed on the quadrangular prism-shaped samples to break them, and a bending strength at the time of breakage was measured. A universal material testing machine (5543 manufactured by Instron Japan) was used for the three-point bending test. A bending strength of 140 MPa or more was considered to be good.

Tables 1A to 2 show the results of the above-mentioned test (evaluation results).

(Evaluation 1)

As shown in Sample Nos. 1 to 17 of Table 1A, the following matters were confirmed provided that components other than $Fe_2O_3$ satisfied predetermined conditions. That is, in Examples where the amount of $Fe_2O_3$ was 40.5 to 50.0 mol %, μ' at 900 MHz was improved, and both of the specific resistance and the bending strength were improved, compared to those in a Comparative Example where the amount of $Fe_2O_3$ was less than 40.5 mol % (Sample No. 1). Moreover, in Examples where the amount of $Fe_2O_3$ was 40.5 to 50.0 mol %, μ' at 900 MHz was improved, and the bending strength was also improved, compared to those in a Comparative Example where the amount of $Fe_2O_3$ was more than 50.0 mol % (Sample No. 17).

In Comparative Examples where the amount of $Fe_2O_3$ was within the range of 40.5 to 50.0 mol %, but the amount (γ) of $SnO_2$ was less than 0.5 parts by weight (Sample Nos. 3 to 5, 7, and 9), the bending strength tended to decrease, and the temperature characteristics of the initial permeability μi tended to deteriorate, compared to those in Examples. Moreover, in a Comparative Example where the amount of $Fe_2O_3$ was within the range of 40.5 to 50.0 mol %, but the amount (α) of ZnO was more than 25.0 mol % (Sample No. 16), μ' at 900 MHz decreased.

As shown in Sample Nos. 18 to 22 of Table 1A, in Comparative Examples where the amount (γ) of $SnO_2$ was less than 0.5 parts by weight (Sample Nos. 18 to 22), the bending strength decreased, and the temperature characteristics of the initial permeability μi deteriorated or μ' at 900 MHz deteriorated, compared to those in Examples.

As shown in Sample Nos. 23 to 41 of Table 1B, the following matters were confirmed provided that components other than ZnO satisfied predetermined conditions. That is, in Examples where the amount (α) of ZnO was 7.0 to 25.0 mol %, the specific resistance was improved compared to that in a Comparative Example where the amount (α) of ZnO was 5.0 mol % (Sample No. 23). Moreover, in Examples where the amount (α) of ZnO was 7.0 to 25.0 mol %, μ' at 900 MHz was improved, and the specific resistance was also improved, compared to those in a Comparative Example where the amount (α) of ZnO was 27.0 mol % (Sample No. 41).

In Comparative Examples where the amount (α) of ZnO was within the range of 7.0 to 25.0 mol %, but the amount (β) of $Co_3O_4$ was less than 3.1 parts by weight (Sample Nos. 25 and 26), μ' at 900 MHz decreased. Moreover, in Comparative Examples where the amount (α) of ZnO was within the range of 7.0 to 25.0 mol %, but the value of A in $A=(\alpha-18)/\beta$ was less than −3.5 (Sample No. 25) and more than 1.0 (Sample No. 38), μ' at 900 MHz decreased compared to that in Examples.

Comparing an Example where β/γ was less than 1.6 (Sample No. 30) with Examples where β/γ was 1.6 or more (Sample Nos. 24, 27 to 29, 31 to 37, and 39 to 40), it was confirmed that at least μ' at 900 MHz was improved by setting β/γ to 1.6 or more.

As shown in Sample Nos. 42 to 63 of Table 1C, the following matters were confirmed provided that components other than CuO satisfied predetermined conditions. That is, in Examples where the amount of CuO was 6.0 to 14.0 mol %, μ' at 900 MHz, the specific resistance, and the bending strength were improved compared to those in a Comparative Example where the amount of CuO was 5.5 mol % (Sample No. 42). Moreover, in Examples where the amount of CuO was 6.0 to 14.0 mol %, μ' at 10 MHz and μ' at 900 MHz were improved, and the specific resistance and the bending strength were also improved, compared to those in a Comparative Example where the amount of CuO was 15.5 mol % (Sample No. 51).

In a Comparative Example where the amount of CuO was in the range of 6.0 to 14.0 mol %, but the amount of $Fe_2O_3$ was less than 40.5 mol % (Sample No. 57), μ' at 900 MHz decreased, and the specific resistance and the bending strength decreased. The reason why the bending strength of the Comparative Example according to Sample No. 57 in Table 1C was higher than that of the Comparative Example according to Sample No. 1 in Table 1A is probably that the amount (β) of $Co_3O_4$ was as low as 5.0 parts by weight or less As shown in Sample Nos. 64 to 80 of Table 2, the following matters were confirmed provided that components other than $SnO_2$ satisfied predetermined conditions. That is, in Examples where the amount of $SnO_2$ was 0.5 to 4.0 mol %, the temperature change rate of the initial permeability μi and the bending strength were improved compared to those in a Comparative Example where the amount of $SnO_2$ was less than 0.5 mol % (Sample No. 64). Moreover, in Examples where the amount of $SnO_2$ was 0.5 to 4.0 mol %, μ' at 900 MHz was improved, and the specific resistance and the bending strength were also improved, compared to those in a Comparative Example where the amount of $SnO_2$ was 4.5 parts by weight (Sample No. 72).

In Examples where β/γ was 1.6 or more (Sample Nos. 65 to 70, 73 to 74, 77 to 78, and 80), at least μ' at 900 MHz was improved compared to that of Examples where β/γ was less than 1.6 (Sample Nos. 71 and 76).

Example 2

Except for adding $Bi_2O_3$ as a raw material of the sub component weighed so as to have the composition shown in Table 3 as a sintered body, samples of the sintered bodies were prepared and evaluated in the same manner as in Example 1. Table 3 shows the results.

As shown in Table 3, the bending strength decreased as the amount of $Bi_2O_3$ increased, but μ' at 900 MHz and the specific resistance were improved.

Example 3

Except for adding $SiO_2$ as a raw material of the sub component weighed so as to have the composition shown in Table 4 as a sintered body, samples of the sintered bodies were prepared and evaluated in the same manner as in Example 1. Table 4 shows the results.

As shown in Table 4, even when $SiO_2$ was contained in a comparatively small amount, μ' at 900 MHz, the temperature change rate of the initial permeability μi, the specific resistance, and the bending strength were at sufficiently satisfactory levels.

TABLE 1A

| | Main Component mol % | | | | Sub Component: Parts by Weight | | | | Characteristics | | | | |
|---|---|---|---|---|---|---|---|---|---|---|---|---|---|
| Sample No. | $Fe_2O_3$ | NiO | CuO | ZnO (α) | $Co_3O_4$ (β) | $SnO_2$ (γ) | $Co_3O_4$/$SnO_2$ (β/γ) | A (α-18)/β | μ' 10 MHz | μ' 900 MHz | % Temperature Change Rate μi | Ωm Specific Resistance ρ | MPa Bending Strength |
| ※1 | 36.5 | 38.0 | 9.5 | 16.0 | 7.0 | 2.0 | 3.5 | −0.3 | 5.1 | 4.8 | 29.1 | 4.3E+04 | 120 |
| 2 | 40.5 | 34.0 | 9.5 | 16.0 | 7.0 | 2.0 | 3.5 | −0.3 | 5.6 | 5.6 | 35.3 | 1.0E+06 | 150 |
| ※3 | 42.9 | 29.0 | 9.5 | 18.6 | 7.0 | 0.0 | — | 0.1 | 8.9 | 6.2 | 54.8 | 2.2E+06 | 125 |
| ※4 | 44.5 | 27.4 | 9.5 | 18.6 | 7.0 | 0.0 | — | 0.1 | 9.6 | 6.5 | 71.3 | 6.8E+06 | 130 |
| ※5 | 45.9 | 26.0 | 9.5 | 18.6 | 7.0 | 0.0 | — | 0.1 | 9.8 | 6.7 | 73.8 | 5.1E+06 | 132 |
| 6 | 45.9 | 26.0 | 9.5 | 18.6 | 7.0 | 1.0 | 7.0 | 0.1 | 8.5 | 6.6 | 57.1 | 1.3E+06 | 161 |
| ※7 | 47.0 | 24.9 | 9.5 | 18.6 | 7.0 | 0.0 | — | 0.1 | 9.6 | 7.1 | 90.2 | 3.0E+06 | 135 |
| 8 | 47.0 | 24.9 | 9.5 | 18.6 | 7.0 | 2.0 | 3.5 | 0.1 | 7.2 | 6.5 | 65.8 | 3.3E+06 | 168 |
| ※9 | 48.0 | 23.9 | 9.5 | 18.6 | 7.0 | 0.0 | — | 0.1 | 9.4 | 7.4 | 96.3 | 2.9E+06 | 130 |
| 10 | 48.0 | 23.9 | 9.5 | 18.6 | 7.0 | 2.0 | 3.5 | 0.1 | 7.6 | 6.1 | 68.7 | 4.08+06 | 164 |
| 11 | 48.0 | 23.9 | 9.5 | 18.6 | 7.0 | 3.0 | 2.3 | 0.1 | 6.9 | 5.6 | 54.6 | 2.8E+06 | 151 |
| 12 | 50.0 | 23.0 | 8.4 | 18.6 | 7.0 | 1.0 | 7.0 | 0.1 | 8.7 | 6.8 | 116.4 | 8.7E+06 | 144 |
| 13 | 50.0 | 23.0 | 8.4 | 18.6 | 7.0 | 2.0 | 3.5 | 0.1 | 7.9 | 6.0 | 94.0 | 3.0E+06 | 154 |
| 14 | 50.0 | 23.0 | 8.4 | 18.6 | 10.0 | 2.0 | 5.0 | 0.1 | 5.4 | 6.5 | 73.1 | 2.1E+06 | 143 |
| 15 | 50.0 | 18.6 | 8.4 | 23.0 | 10.0 | 2.0 | 5.0 | 0.5 | 7.8 | 6.0 | 71.0 | 3.2E+06 | 140 |
| ※16 | 50.0 | 14.6 | 8.4 | 27.0 | 10.0 | 2.0 | 5.0 | 0.9 | 11.1 | 5.1 | 67.4 | 4.3E+06 | 146 |
| ※17 | 52.5 | 26.1 | 8.4 | 13.0 | 5.0 | 1.0 | 5.0 | −1.0 | 6.0 | 4.3 | 15.0 | 2.7E+06 | 51 |
| ※18 | 45.9 | 39.6 | 9.5 | 5.0 | 1.5 | 0.0 | — | −8.7 | 13.0 | 4.8 | 35.9 | 4.6E+06 | 135 |
| ※19 | 45.9 | 39.6 | 9.5 | 5.0 | 2.7 | 0.0 | — | −4.8 | 7.0 | 5.7 | 67.4 | 9.1E+06 | 126 |
| ※20 | 45.9 | 39.6 | 9.5 | 5.0 | 3.5 | 0.0 | — | −3.7 | 5.5 | 5.9 | 81.2 | 2.8E+06 | 127 |
| ※21 | 45.9 | 35.6 | 9.5 | 9.0 | 3.5 | 0.0 | — | −2.6 | 8.2 | 6.4 | 73.9 | 1.0E+07 | 104 |
| ※22 | 45.9 | 31.4 | 9.5 | 13.2 | 5.0 | 0.0 | — | −1.0 | 8.4 | 6.8 | 82.9 | 2.8E+06 | 138 |

TABLE 1B

| | Main Component mol % | | | | Sub Component: Parts by Weight | | | | Characteristics | | | | |
|---|---|---|---|---|---|---|---|---|---|---|---|---|---|
| Sample No. | $Fe_2O_3$ | NiO | CuO | ZnO (α) | $Co_3O_4$ (β) | $SnO_2$ (γ) | $Co_3O_4$/$SnO_2$ (β/γ) | A (α-18)/β | μ' 10 MHz | μ' 900 MHz | % Temperature Change Rate μi | Ωm Specific Resistance ρ | MPa Bending Strength |
| ※23 | 45.9 | 39.6 | 9.5 | 5.0 | 4.0 | 2.0 | 2.0 | −3.3 | 5.1 | 5.7 | 54.9 | 1.3E+05 | 144 |
| 24 | 45.9 | 39.6 | 9.5 | 7.0 | 3.1 | 2.0 | 1.6 | −3.5 | 6.5 | 5.6 | 56.8 | 1.8E+06 | 179 |
| ※25 | 45.9 | 35.6 | 9.5 | 9.0 | 1.5 | 2.0 | 0.8 | -6.0 | 16.1 | 4.6 | 27.1 | 2.2E+06 | 193 |
| ※26 | 45.9 | 35.6 | 9.5 | 9.0 | 3.0 | 2.0 | 1.5 | −3.0 | 7.9 | 5.1 | 56.3 | 5.1E+06 | 183 |
| 27 | 45.9 | 35.6 | 9.5 | 9.0 | 3.5 | 2.0 | 1.8 | −2.6 | 6.8 | 5.7 | 55.3 | 2.1E+06 | 177 |
| 28 | 45.9 | 33.6 | 9.5 | 11.0 | 3.5 | 2.0 | 1.8 | −2.0 | 7.8 | 5.8 | 53.8 | 3.4E+06 | 162 |
| 29 | 45.9 | 31.4 | 9.5 | 13.2 | 3.1 | 2.0 | 1.6 | −1.5 | 10.4 | 5.5 | 45.3 | 1.9E+06 | 195 |
| 30 | 45.9 | 31.4 | 9.5 | 13.2 | 3.1 | 2.1 | 1.5 | −1.5 | 10.0 | 5.3 | 44.3 | 1.4E+06 | 189 |
| 31 | 45.9 | 31.4 | 9.5 | 13.2 | 3.5 | 2.0 | 1.8 | −1.4 | 9.8 | 6.0 | 52.1 | 2.6E+06 | 196 |
| 32 | 45.9 | 31.4 | 9.5 | 13.2 | 4.0 | 2.0 | 2.0 | −1.2 | 8.7 | 6.1 | 54.8 | 2.2E+06 | 208 |
| 33 | 45.9 | 31.4 | 9.5 | 13.2 | 4.5 | 2.0 | 2.3 | −1.1 | 7.4 | 6.2 | 60.2 | 1.9E+06 | 177 |
| 34 | 45.9 | 28.6 | 9.5 | 16.0 | 5.5 | 2.0 | 2.8 | −0.4 | 8.7 | 6.4 | 52.5 | 1.7E+06 | 189 |
| 35 | 45.9 | 26.0 | 9.5 | 18.6 | 6.2 | 2.0 | 3.1 | 0.1 | 9.1 | 6.2 | 48.0 | 1.0E+06 | 205 |
| 36 | 45.9 | 26.0 | 9.5 | 18.6 | 8.0 | 1.0 | 8.0 | 0.1 | 7.3 | 6.7 | 60.6 | 1.4E+06 | 187 |
| 37 | 45.9 | 21.6 | 9.5 | 23.0 | 8.0 | 2.0 | 4.0 | 0.6 | 9.2 | 6.2 | 48.5 | 1.1E+06 | 207 |
| ※38 | 45.9 | 19.6 | 9.5 | 25.0 | 6.0 | 2.0 | 3.0 | 1.2 | 14.6 | 4.8 | 44.6 | 2.3E+06 | 195 |
| 39 | 45.9 | 19.6 | 9.5 | 25.0 | 7.0 | 2.0 | 3.5 | 1.0 | 11.2 | 5.5 | 44.2 | 1.8E+06 | 180 |
| 40 | 45.9 | 19.6 | 9.5 | 25.0 | 8.0 | 2.0 | 4.0 | 0.9 | 9.9 | 5.8 | 43.3 | 1.4E+06 | 183 |
| ※41 | 45.9 | 17.6 | 9.5 | 27.0 | 9.0 | 2.0 | 4.5 | 1.0 | 9.3 | 5.2 | 37.6 | 9.5E+05 | 151 |

TABLE 1C

| | Main Component mol % | | | | Sub Component Parts by Weight | | Sub Component | Characteristics | | | | | |
|---|---|---|---|---|---|---|---|---|---|---|---|---|---|
| Sample No. | $Fe_2O_3$ | NiO | CuO | ZnO (α) | $Co_3O_4$ (β) | $SnO_2$ (γ) | $Co_3O_4$/$SnO_2$ (β/γ) | A (α-18)/β | μ' 10 MHz | μ' 900 MHz | % Temperature Change Rate μi | Ωm Specific Resistance ρ | MPa Bending Strength |
| ※42 | 45.0 | 33.5 | 5.5 | 16.0 | 5.0 | 2.0 | 2.5 | −0.4 | 7.8 | 5.1 | 26.8 | 9.6E+05 | 100 |
| 43 | 45.0 | 33.0 | 6.0 | 16.0 | 5.0 | 2.0 | 2.5 | −0.4 | 8.3 | 5.6 | 42.5 | 2.7E+06 | 157 |
| 44 | 45.0 | 31.0 | 8.0 | 16.0 | 5.0 | 2.0 | 2.5 | −0.4 | 9.0 | 5.8 | 43.1 | 4.1E+06 | 190 |
| 45 | 45.0 | 30.5 | 8.5 | 16.0 | 5.0 | 2.0 | 2.5 | −0.4 | 9.1 | 5.9 | 45.6 | 6.9E+06 | 189 |
| 46 | 45.0 | 30.0 | 9.0 | 16.0 | 5.0 | 2.0 | 2.5 | −0.4 | 9.2 | 5.9 | 43.6 | 9.1E+06 | 190 |
| 47 | 45.0 | 29.5 | 9.5 | 16.0 | 5.0 | 2.0 | 2.5 | −0.4 | 9.2 | 6.1 | 47.9 | 1.5E+06 | 175 |
| 48 | 45.0 | 28.0 | 11.0 | 16.0 | 5.0 | 2.0 | 2.5 | −0.4 | 8.2 | 5.8 | 45.8 | 3.4E+06 | 174 |
| 49 | 45.0 | 26.5 | 12.5 | 16.0 | 5.0 | 2.0 | 2.5 | −0.4 | 8.2 | 5.8 | 45.5 | 5.2E+06 | 190 |
| 50 | 45.0 | 25.0 | 14.0 | 16.0 | 5.0 | 2.0 | 2.5 | −0.4 | 7.1 | 5.6 | 40.8 | 2.8E+06 | 153 |
| ※51 | 45.0 | 23.5 | 15.5 | 16.0 | 5.0 | 2.0 | 2.5 | −0.4 | 4.0 | 4.8 | 35.3 | 4.0E+05 | 127 |
| 52 | 43.0 | 32.5 | 8.5 | 16.0 | 5.0 | 2.0 | 2.5 | −0.4 | 8.4 | 5.7 | 40.8 | 3.3E+06 | 179 |
| 53 | 44.0 | 31.5 | 8.5 | 16.0 | 5.0 | 2.0 | 2.5 | −0.4 | 8.8 | 5.9 | 42.5 | 4.9E+06 | 183 |
| 54 | 47.0 | 26.0 | 11.0 | 16.0 | 5.0 | 2.0 | 2.5 | −0.4 | 8.0 | 5.8 | 44.9 | 1.1E+06 | 160 |
| 55 | 47.0 | 24.5 | 12.5 | 16.0 | 5.0 | 2.0 | 2.5 | −0.4 | 9.1 | 5.7 | 57.2 | 1.4E+07 | 170 |
| 56 | 48.0 | 25.0 | 11.0 | 16.0 | 5.0 | 2.0 | 2.5 | −0.4 | 9.3 | 5.7 | 55.0 | 1.6E+07 | 191 |
| ※57 | 36.5 | 38.0 | 9.5 | 16.0 | 5.0 | 1.0 | 5.0 | −0.4 | 7.2 | 4.9 | 29.8 | 1.8E+05 | 135 |
| 58 | 40.5 | 34.0 | 9.5 | 16.0 | 5.0 | 1.0 | 5.0 | −0.4 | 8.4 | 5.6 | 41.8 | 1.3E+06 | 159 |
| 59 | 43.9 | 30.6 | 9.5 | 16.0 | 5.0 | 1.5 | 3.3 | −0.4 | 9.2 | 6.1 | 52.6 | 2.1E+06 | 176 |
| 60 | 47.0 | 27.5 | 9.5 | 16.0 | 5.0 | 1.0 | 5.0 | −0.4 | 9.3 | 6.7 | 63.3 | 1.4E+06 | 166 |
| 61 | 47.0 | 27.5 | 9.5 | 16.0 | 5.0 | 1.5 | 3.3 | −0.4 | 8.9 | 6.5 | 60.7 | 1.2E+06 | 162 |
| 62 | 47.0 | 27.5 | 9.5 | 16.0 | 5.0 | 2.0 | 2.5 | −0.4 | 8.5 | 6.2 | 57.3 | 1.1E+06 | 173 |
| 63 | 47.0 | 27.5 | 9.5 | 16.0 | 5.5 | 1.0 | 5.5 | −0.4 | 8.6 | 6.8 | 66.8 | 2.0E+06 | 155 |

TABLE 2

| | Main Component mol % | | | | Sub Component Parts by Weight | | Sub Component | Characteristics | | | | | |
|---|---|---|---|---|---|---|---|---|---|---|---|---|---|
| Sample No. | $Fe_2O_3$ | NiO | CuO | ZnO (α) | $Co_3O_4$ (β) | $SnO_2$ (γ) | $Co_3O_4$/$SnO_2$ (β/γ) | A (α-18)/β | μ' 10 MHz | μ' 900 MHz | % Temperature Change Rate μi | Ωm Specific Resistance ρ | MPa Bending Strength |
| ※64 | 45.9 | 28.6 | 9.5 | 16.0 | 5.0 | 0.0 | — | −0.4 | 11.2 | 6.8 | 81.1 | 1.8E+07 | 137 |
| 80 | 45.9 | 28.6 | 9.5 | 16.0 | 7.5 | 0.6 | 12.5 | −0.3 | 6.9 | 6.6 | 69.3 | 6.4E+06 | 143 |
| 65 | 45.9 | 28.6 | 9.5 | 16.0 | 5.0 | 0.5 | 10.0 | −0.4 | 10.7 | 6.7 | 67.5 | 1.3E+07 | 158 |
| 66 | 45.9 | 28.6 | 9.5 | 16.0 | 5.0 | 0.8 | 6.3 | −0.4 | 10.4 | 6.7 | 64.4 | 8.9E+06 | 169 |
| 67 | 45.9 | 28.6 | 9.5 | 16.0 | 5.0 | 1.0 | 5.0 | −0.4 | 10.2 | 6.6 | 62.5 | 4.4E+06 | 184 |
| 68 | 45.9 | 28.6 | 9.5 | 16.0 | 5.0 | 2.0 | 2.5 | −0.4 | 9.5 | 6.2 | 51.6 | 3.0E+06 | 197 |
| 69 | 45.9 | 28.6 | 9.5 | 16.0 | 5.0 | 2.5 | 2.0 | −0.4 | 8.9 | 6.1 | 45.7 | 2.4E+06 | 192 |
| 70 | 45.9 | 28.6 | 9.5 | 16.0 | 5.0 | 3.0 | 1.7 | −0.4 | 8.4 | 5.9 | 45.1 | 2.2E+06 | 202 |
| 71 | 45.9 | 28.6 | 9.5 | 16.0 | 5.0 | 4.0 | 1.3 | −0.4 | 6.9 | 5.3 | 33.4 | 1.8E+06 | 149 |
| ※72 | 45.9 | 28.6 | 9.5 | 16.0 | 5.0 | 4.5 | 1.1 | −0.4 | 6.1 | 5.1 | 27.2 | 8.3E+05 | 125 |
| 73 | 45.9 | 28.6 | 9.5 | 16.0 | 8.0 | 4.0 | 2.0 | −0.3 | 5.0 | 6.4 | 46.6 | 1.8E+06 | 165 |
| 74 | 45.9 | 28.6 | 9.5 | 16.0 | 3.1 | 2.0 | 1.6 | −0.6 | 11.5 | 5.5 | 37.9 | 4.6E+06 | 158 |
| ※75 | 45.9 | 28.6 | 9.5 | 16.0 | 0.0 | 3.0 | — | — | 41.8 | 3.3 | −1.8 | 3.8E+06 | 183 |
| 76 | 45.9 | 28.6 | 9.5 | 16.0 | 3.1 | 3.0 | 1.0 | −0.6 | 10.6 | 5.3 | 32.6 | 3.8E+06 | 145 |
| 77 | 45.9 | 28.6 | 9.5 | 16.0 | 8.0 | 3.0 | 2.7 | −0.3 | 5.6 | 6.9 | 51.4 | 1.9E+06 | 174 |
| 78 | 45.9 | 28.6 | 9.5 | 16.0 | 10.0 | 3.0 | 3.3 | −0.2 | 4.7 | 5.9 | 50.5 | 1.2E+06 | 156 |
| ※79 | 45.9 | 28.6 | 9.5 | 16.0 | 11.0 | 3.0 | 3.7 | −0.2 | 4.5 | 5.9 | 48.5 | 1.9E+05 | 142 |

※Comparative Examples

TABLE 3

| Sample No. | Main Component mol % $Fe_2O_3$ | NiO | CuO | ZnO (α) | Sub Component Parts by Weight $Co_3O_4$ (β) | $SnO_2$ (γ) | $Bi_2O_3$ | $Co_3O_4$/$SnO_2$ (β/γ) | A (α-18)/β | μ' 10 MHz | μ' 900 MHz | % Temperature Change Rate μi | Ωm Specific Resistance ρ | MPa Bending Strength |
|---|---|---|---|---|---|---|---|---|---|---|---|---|---|---|
| 70 | 45.9 | 28.6 | 9.5 | 16.0 | 5.0 | 3.0 | 0.00 | 1.7 | −0.4 | 8.4 | 5.9 | 45.1 | 2.2E+06 | 202 |
| 84 | 45.9 | 28.6 | 9.5 | 16.0 | 5.0 | 3.0 | 0.10 | 1.7 | −0.4 | 8.1 | 5.8 | 35.7 | 1.1E+06 | 185 |
| 85 | 45.9 | 28.6 | 9.5 | 16.0 | 5.0 | 3.0 | 0.20 | 1.7 | −0.4 | 8.5 | 5.9 | 39.9 | 2.6E+06 | 176 |
| 81 | 45.9 | 28.6 | 9.5 | 16.0 | 5.0 | 3.0 | 0.30 | 1.7 | −0.4 | 9.1 | 6.0 | 42.8 | 4.5E+06 | 161 |
| 82 | 45.9 | 28.6 | 9.5 | 16.0 | 5.0 | 3.0 | 0.50 | 1.7 | −0.4 | 9.3 | 6.1 | 48.8 | 6.8E+06 | 150 |
| 83 | 45.9 | 28.6 | 9.5 | 16.0 | 5.0 | 3.0 | 0.55 | 1.7 | −0.4 | 9.5 | 6.3 | 50.5 | 1.8E+07 | 140 |

TABLE 4

| Sample No. | Main Component mol % $Fe_2O_3$ | NiO | CuO | ZnO (α) | Sub Component Parts by Weight $Co_3O_4$ (β) | $SnO_2$ (γ) | $Bi_2O_3$ | $Co_3O_4$/$SnO_2$ (β/γ) | A (α-18)/β | μ' 10 MHz | μ' 900 MHz | % Temperature Change Rate μi | Ωm Specific Resistance ρ | MPa Bending Strength |
|---|---|---|---|---|---|---|---|---|---|---|---|---|---|---|
| 70 | 45.9 | 28.6 | 9.5 | 16.0 | 5.0 | 3.0 | 0.00 | 1.7 | −0.4 | 8.4 | 5.9 | 45.1 | 2.2E+06 | 202 |
| 86 | 45.9 | 28.6 | 9.5 | 16.0 | 5.0 | 3.0 | 0.10 | 1.7 | −0.4 | 6.9 | 5.7 | 27.1 | 1.3E+06 | 188 |
| 87 | 45.9 | 28.6 | 9.5 | 16.0 | 5.0 | 3.0 | 0.15 | 1.7 | −0.4 | 6.8 | 5.6 | 27.9 | 1.3E+06 | 174 |

DESCRIPTION OF THE REFERENCE NUMERICAL

1, 1*a* . . . chip coil
2 . . . ceramic layer
3, 3*a* . . . internal electrode layer
4, 4*a* . . . chip body
5 . . . terminal electrode
6 . . . terminal connection through-hole electrode
6*a* . . . leading electrode
30, 30*a* . . . coil conductor

What is claimed is:

1. A ferrite composition comprising a main component and a sub component, wherein the main component includes:

40.5 to 50.0 mol % of an iron oxide in terms of $Fe_2O_3$;

6.0 to 14.0 mol % of a copper oxide in terms of CuO;

7.0 to 25.0 mol % of a zinc oxide in terms of ZnO; and a nickel oxide as a remainder of the main component, with respect to 100 parts by weight of the main component, the sub component includes:

3.1 to 10.0 parts by weight of a cobalt oxide in terms of $Co_3O_4$;

0.5 to 4.0 parts by weight of a tin oxide in terms of $SnO_2$; and less than 0.20 parts by weight (including zero) of a bismuth oxide in terms of $Bi_2O_3$, and A is −3.5 or more and 1.0 or less, provided that $A=(\alpha-18)/\beta$, wherein α is an amount of the zinc oxide represented by mol % in terms of ZnO in the main component, and β is an amount of the cobalt oxide represented by parts by weight in terms of $Co_3O_4$ with respect to 100 parts by weight of the main component.

2. The ferrite composition according to claim 1, wherein β/γ is 1.6 or more, in which γ is an amount of the tin oxide in terms of $SnO_2$ with respect to 100 parts by weight of the main component.

3. A ferrite sintered body comprising the ferrite composition according to claim 1.

4. An electronic device comprising the ferrite composition according to claim 1.

5. The ferrite composition according to claim 1, wherein the sub component further includes less than 0.20 parts by weight (including zero) of a silicon oxide in terms of $SiO_2$ with respect to 100 parts by weight of the main component.

6. The ferrite composition according to claim 1, wherein the ferrite composition is substantially free of bismuth oxide.

7. The ferrite composition according to claim 1, wherein the amount of bismuth oxide is zero.

8. The ferrite composition according to claim 1, wherein the amount of bismuth oxide is 0.10 or less parts by weight with respect to 100 parts by weight of the main component.

* * * * *